(12) United States Patent
King

(10) Patent No.: US 7,443,848 B2
(45) Date of Patent: Oct. 28, 2008

(54) EXTERNAL DEVICE-BASED PREFETCHING MECHANISM

(75) Inventor: Steven R. King, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 10/955,598

(22) Filed: Sep. 29, 2004

(65) Prior Publication Data

US 2006/0072562 A1    Apr. 6, 2006

(51) Int. Cl.
*H04L 12/56* (2006.01)
(52) U.S. Cl. .................................. 370/389; 370/463
(58) Field of Classification Search ................ 370/389, 370/392, 463; 709/223; 710/244
See application file for complete search history.

(56) References Cited

U.S. PATENT DOCUMENTS

| | | | |
|---|---|---|---|
| 6,438,130 B1 * | 8/2002 | Kagan et al. ................ 370/392 |
| 6,810,418 B1 * | 10/2004 | Shah et al. ................... 709/223 |
| 7,120,152 B2 * | 10/2006 | Park ....................... 370/395.32 |
| 7,360,027 B2 * | 4/2008 | Huggahalli et al. |
| 2004/0156362 A1 * | 8/2004 | Pathi et al. ................... 370/389 |
| 2005/0111447 A1 * | 5/2005 | Soukup ....................... 370/389 |
| 2005/0198400 A1 * | 9/2005 | Minturn |
| 2005/0270983 A1 * | 12/2005 | Remedios .................... 370/252 |
| 2005/0286513 A1 * | 12/2005 | King |
| 2006/0045089 A1 * | 3/2006 | Bacher et al. ................ 370/392 |
| 2007/0067698 A1 * | 3/2007 | King |

* cited by examiner

*Primary Examiner*—Ricky Ngo
*Assistant Examiner*—Gary Mui
(74) *Attorney, Agent, or Firm*—Blakely, Sokoloff, Taylor & Zafman LLP

(57) ABSTRACT

A system, method, and apparatus are provided for external device-based prefetching mechanism. According to one embodiment, a packet is received at a network interface card in communication with a host computer system and a network. The packet is received from the network and includes a context as indicated by a packet address. Then, lookup in packet context table is performed. If a match is found, the received packet is associated with host memory addresses that are sent by the NIC to the processor as prefetch directives. The packet is then forwarded to the host computer system.

12 Claims, 4 Drawing Sheets

EXTERNAL DEVICE-BASED PREFETCHING MECHANISM

BACKGROUND

1. Field of the Invention

Embodiments of this invention relate generally to processors. More particularly, an embodiment of the present invention relates to having an external device-based prefetching mechanism.

2. Description of Related Art

Networks enable computers and other devices to communicate. For example, networks can carry data representing video, audio, e-mail, and so forth. Communicating on a network imposes overhead on a processor. As network speeds increase beyond 1 gigabit per second, network overhead grows significantly and consumes much of the available capability of the processor. One specific source of network processing overhead results when a processor incurs a cache miss. A cache miss can cause a processor to lose hundreds of cycles of otherwise useful processing time and thus, decreases performance and inefficiency.

A number of approaches have been used to decrease networking overhead. One approach has been to offload network protocol processing onto a network interface card (NIC). This approach is costly and complex compared to traditional NIC devices. Another approach is to design "memory aware" protocol implementations that attempt to avoid unnecessary processor cache misses. However, such protocol implementations are complex and finely tuned, making them difficult to maintain and adapt.

BRIEF DESCRIPTION OF THE DRAWINGS

The appended claims set forth the features of the embodiments of the present invention with particularity. The embodiments of the present invention, together with its advantages, may be best understood from the following detailed description taken in conjunction with the accompanying drawings of which:

DETAILED DESCRIPTION

Figure 1:
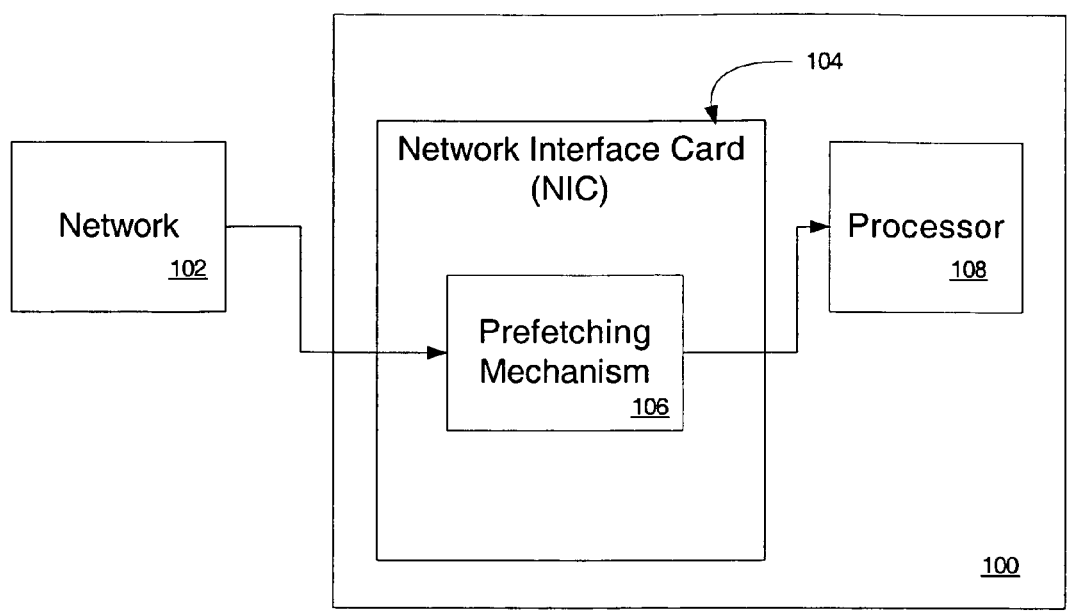
FIG. 1 is a block diagram illustrating an embodiment of a computer system having a NIC for interfacing with a network.

Described below is a system and method for using prefetching to speed up the processing of network traffic. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIG. 1 is a block diagram illustrating an embodiment of a host computer system (system) 100 having a NIC 104 for interfacing with a network 102. The system 100 may further include a processor 108 and a variety of other components, such as memory, input/output (I/O) devices, and the like, as described in reference to FIG. 4 (e.g., system 100 may be similar to system 400 and processor 108 may be similar to one of processors 402-406). These various components of the system 100 communicate over a host bus.

The host system 100 processes the network protocol stack (e.g., transmission control protocol (TCP), stream control transmission protocol (SCTP), remote direct memory access (RDMA) protocol, Internet protocol (IP), etc). The NIC 104, for example, includes hash logic for performing hashing functions. A hash table or "hashing" is the creation of an index to the table content derived from transformation of the information being stored. A hash table or index of the stored information may be used to facilitate efficient searching of the information being stored. In one embodiment, the NIC includes a prefetching mechanism 106, which is further described in reference to FIG. 2. For example, the prefetching mechanism 106 is used to help decrease the chance of the processor 108 incurring a cache miss when processing traffic from the network 102.

The traffic between the processor 108 and the network 102 refers to data sent and received between the processor 108 of the host system 100 and the network 102 across a wider network containing other systems and networks. The data is divided into smaller messages known as packets (e.g., by analogy, a packet is much like a mailing envelope that is dropped in a mailbox). A packet typically includes payload and a protocol header (header). The packet's payload is analogous to the letter or information inside the envelope. The packet's header is much like the information written on the envelope itself. The header may include information to help network devices handle the packet appropriately (e.g., an address that identifies the packet's destination). Furthermore, a given packet may move through many different intermediate network devices (e.g., routers, bridges, and switches) before reaching its destination. These intermediate devices often perform a variety of packet processing operations. For example, intermediate devices perform address lookup and packet classification to determine how to forward a packet further toward its destination or to determine the quality of service to provide. An intermediate device features a number of different interfaces to connect the intermediate device to other network devices.

Referring back to the NIC 104, it refers to a hardware device at the system 100 to connect the system 100 to a network 102. The network 102 may include various types of networks, such as a local area network (LAN), wide area network (WAN), a metropolitan area network (MAN), and the like. The NIC 104 communicates with the host bus and is controlled by the host processor 108 in a manner similar to the way the host processor 108 controls an I/O device. Thus, the host system 100 may recognize the NIC 104 as an I/O device, while the network 102 may recognize the NIC 104 as an attached computer that can send and receive packets.

Figure 2:
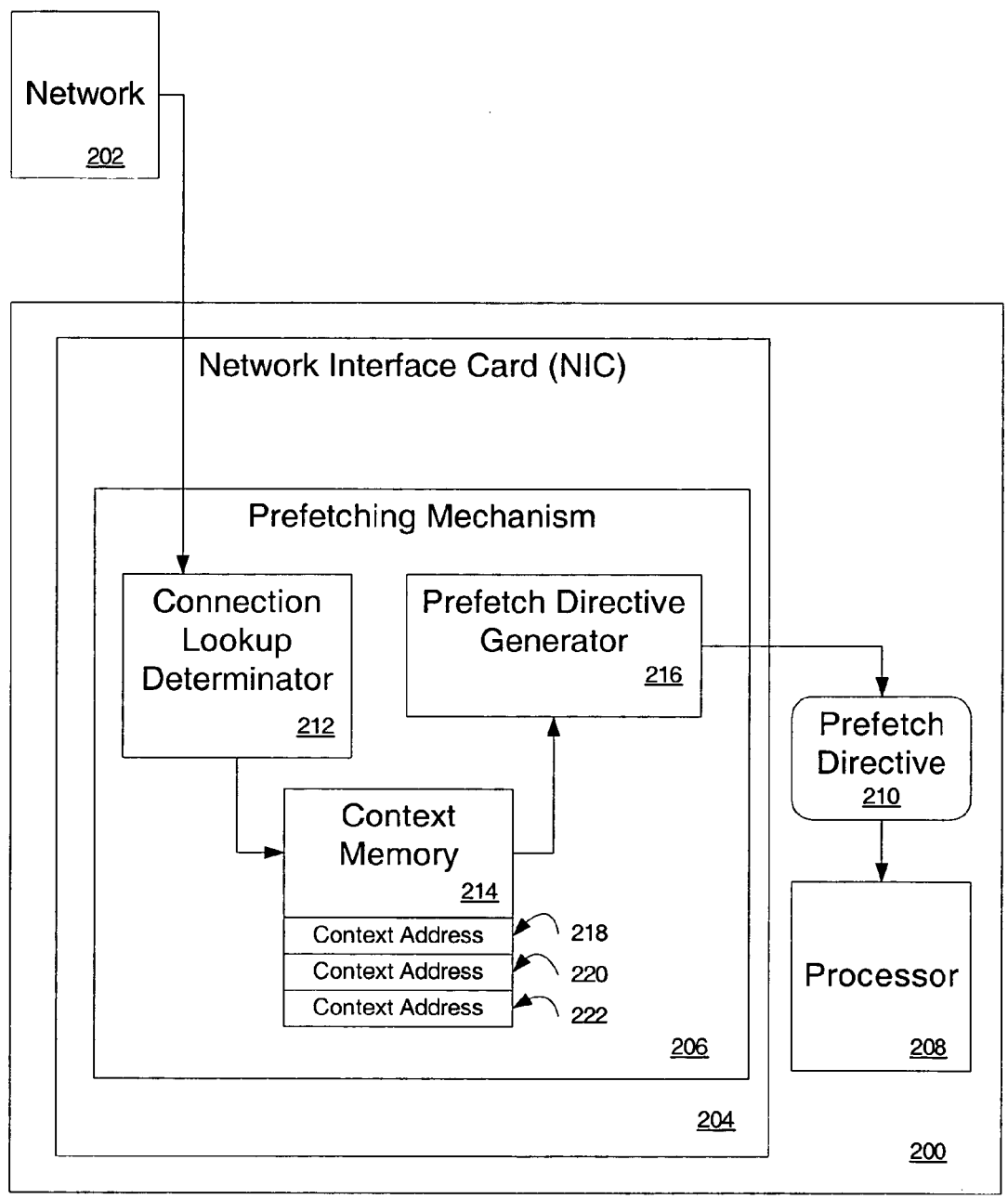
FIG. 2 is a block diagram illustrating an embodiment of a host computer system having a NIC for interfacing with a network, and the NIC having a prefetching mechanism.

FIG. 2 is a block diagram illustrating an embodiment of a host computer system 200 having a NIC 204 for interfacing with a network 202, and the NIC 204 having a prefetching mechanism 206. As described with reference to FIG. 1, the NIC 204 receives packets (e.g., SCTP/IP packets) from the network 202, and also forwards packets to the network 202. The NIC 204 may include a hashing logic for performing hashing functions. The NIC 204 may also include a NIC resident context table. The context table contains physical addresses valid in the host memory system. The context table is loaded into the NIC 204 by the host system 200.

In one embodiment, the process generally includes hashing by the NIC 204 to compute a possible match in the context memory 214 for the connection associated with the packet. Stated differently, the NIC 204 includes hashing logic to generate a hashing value from a packet received over a network, that hashing value used to reference into a NIC 204 resident context memory 214 for storing host memory physical addresses.

In one embodiment, the NIC 204 includes the prefetching mechanism 206. The prefetching mechanism 206 may include various components, such as connection or context lookup determinator (determinator) 212, context memory 214, and prefetch directive generator (generator) 216. The process for processing the packets begins with the NIC 204 receiving an incoming packet or data over the network 202. Each arriving packet contains connection identification, herein also referred to as address. First, the determinator 212 checks a recently seen table at the NIC 204 to determine whether the address has been recently seen. If determined that the address has been recently seen, then the inbound data or packet is sent directly to host memory without performing any prefetch operations. Prefetch operations are not issued to the host processor 208, because having recently seen the address indicates the address is probably already in the cache of the processor 208.

In one embodiment, each context address 218-222 is a known context address representing host memory addresses to be sent to the processor 208 as prefetch directives 210. For example, context address 218 may include host memory address 1, host memory address 2, host memory address 3, . . . host memory address N. Similarly, context address 220 may include host memory address 1, host memory address 2, host memory address 3, . . . host memory address N. Stated differently, the context memory 214 with its context addresses 218-222 having host memory addresses resides on the NIC 204 and thus, eliminating the need for the NIC 204 to access the host memory to seek an address that matches with the address of the inbound packet. Instead, the matching process is performed using the context memory 214 residing at the NIC 204.

In one embodiment, if the address is not found in the recently seen table, the determinator 212 may look to compare the address with a set of known context addresses 218-222 at the context memory 214. For example, the determinator 212 compares the address with the set of known context addresses 218-222 found in the context memory 214. The known context addresses 218-222 are representative of any number of known context storage locations. If, after comparing the address of the inbound packet to the known context addresses 218-222 in the context memory 214, a match is not found, the inbound packet can then be sent directly to the processor 208 without performing any prefetch operations. On the other hand, if a match is found with one of known context addresses 218-222 in the context memory 214, then each host memory address stored at the matching location is sent to the generator 216. An embodiment may contain any number of host memory addresses for each known context address. Furthermore, the inbound packet is sent to the host processor.

In one embodiment, the generator 216 generates a prefetch directive for each host memory address found within the matching known context location. This prefetch directive 210 is used to alert the host processor 208 that data with that address is soon to be received and that the processor 208 is to put that address in its cache. Prefetch directives 210 help speed up the processing time of processors 208 by reducing cache misses. Prefetch directives 210 help reduce cache misses in processors 208 because instead of the processor 208 discovering the need to load an address into the cache at access time, the processor 208 places the address into the cache well before the need to access the address occurs. In one embodiment, the determinator 212 may update the table of recently seen connections upon detecting a match of the packet address with a known context address 218-222. The table of recently seen connections is not modified if the packet did not match a known context address 218-222.

Figure 3:
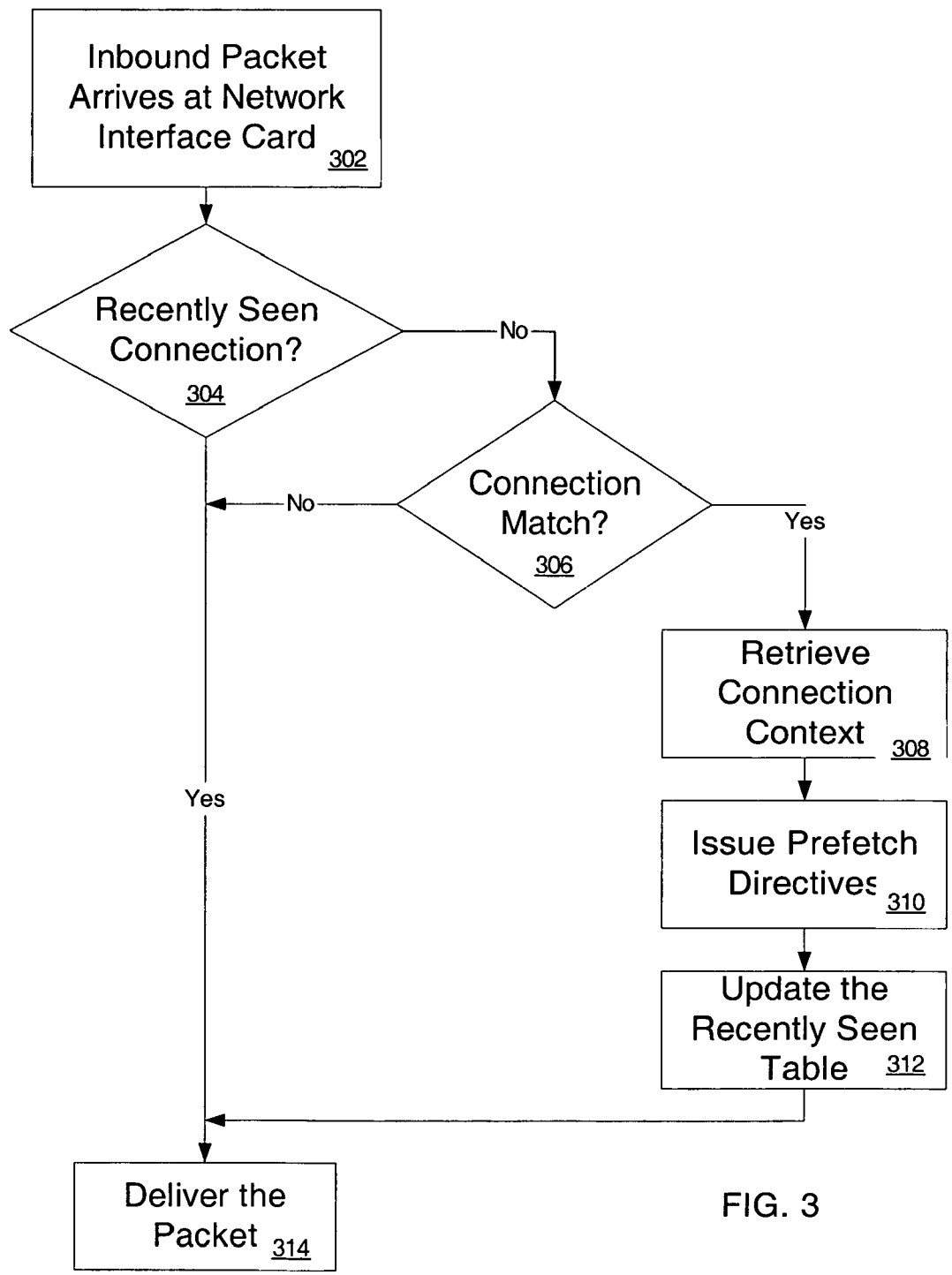
FIG. 3 is a flow diagram illustrating an embodiment of a process for using a NIC-based prefetching mechanism.

FIG. 3 is a flow diagram illustrating an embodiment of a process for using a NIC-based prefetching mechanism. First, an inbound packet arrives at the NIC at a host computer system at processing block 302. The inbound packet contains data having connection identification information, herein referred to as address. At decision block 304, the address of the inbound packet is checked against a recently seen table to determine if the same address contained in the inbound packet has recently gone through the prefetching process. If yes, the packet is delivered to the processor. If the address of the packet has been seen recently, the processor is believed to probably already have the address of the packet in its cache and thus, no prefetching is necessitated. For example, specifically, in network traffic, much of the inbound data arrives in sequence bound for the same address, meaning each inbound packet has the same connection context information, and so, prefetching is only needed to be preformed the first time the address is seen.

Referring back to decision block 304, if the address of the packet has not been recently seen, then the process moves for another determination to decision block 306. At decision block 306, a determination is made as to whether the inbound packet's address has a match with any of the set of known context addresses in the context memory residing at NIC. A non-match may indicate that the NIC is not prefetching on this particular type of connection and thus, the inbound packet is sent to the processor without a prefetch directive at processing block 312.

Referring back to decision block 306, in one embodiment, if the inbound packet's address matches one of known context addresses in the context memory, connection context information is retrieved at processing block 308. In one embodiment, the matching may be performed using the protocol header value (e.g., TCP/IP or RDMA) of the inbound packet. For example, in the case of TCP/IP, context lookup is performed based on the tuple of source IP address, source TCP port, destination IP address, and destination TCP port. With regard to RDMA, context lookup is performed using the STag value of the RDMA protocol header. If a match is found, the connection context information is retrieved from context memory at the matching known context entry. In one embodiment, the connection context information is retrieved using any one or more of software modules, hardware components, and any combination thereof. The inbound packet's connection context information contains prefetch addresses used at processing block 310. It is contemplated that the matching process may vary depending on the nature of the network protocol being used and on requirements, limitations, and necessities of various networks and systems.

Referring back to decision block 306, if the context is not matched, the packet is delivered at processing block 314. If the context is matched, in one embodiment, at processing block 310, a prefetch directive is issued from the NIC to the processor for each host memory address stored in the packet's connection context. The retrieved connection context information is associated with and corresponds to the matched packet's address. The prefetch directive is used to alert the processor of the nature of the connections the processor may be observing or encountering in the near future. The prefetch directive further causes the processor to put the prefetch address into its cache. Now, because such information is in the processor cache, when the inbound packet finally arrives at the processor (at a later time), most chances of encountering a cache miss are eliminated. Without the NIC-based prefetch mechanism issuing the prefetch directive, a cache miss is more likely to occur and may cause the processor to lose hundreds of clock cycles, which reduces performance and efficiency.

Prior to, or simultaneous with, the inbound packet being delivered to the processor, the recently seen table is updated with the packet address from the inbound packet at processing block 312. This is done so that when other potential inbound packets with the same address arrive at the NIC, such potential inbound packets may be sent directly to the processor (without further processing). For example, updating of the recently seen table saves from sending redundant prefetch directives to the processor to avoid overloading the interfaces the processor. The inbound packet with its information and data is then delivered to the processor at processing block 314.

Figure 4:
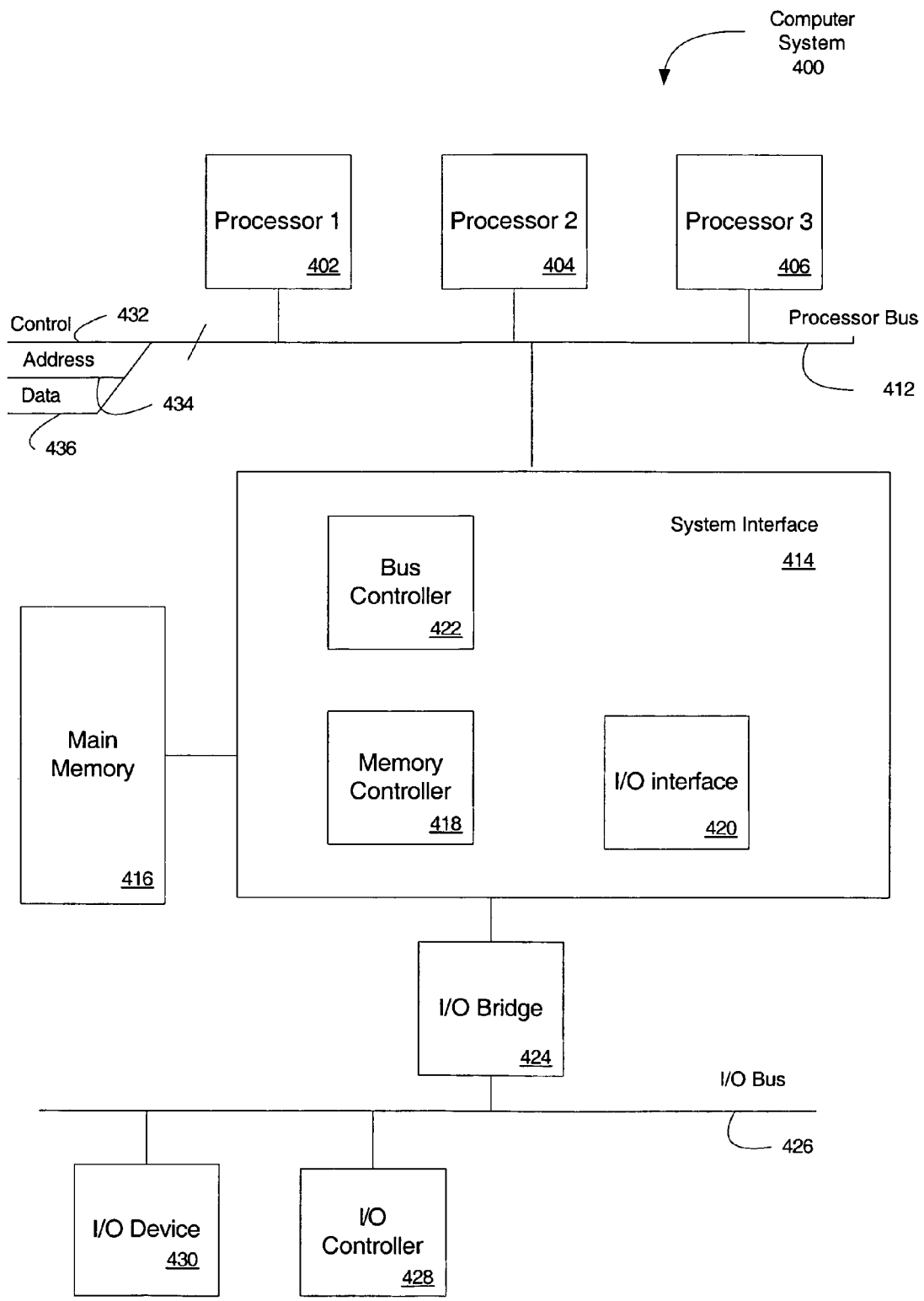
FIG. 4 is a block diagram illustrating an exemplary computer system used in implementing one or more embodiments of the present invention.

FIG. 4 is a block diagram illustrating an exemplary computer system used in implementing one or more embodiments of the present invention. The system includes one or more processors 402-406. The processors 402-406 may include one or more single-threaded or multi-threaded processors. A typical multi-threaded processor may include multiple threads or logical processors, and may be capable of processing multiple instruction sequences concurrently using its multiple threads. Processors 402-406 may also include one or more internal levels of cache (not shown) and a bus controller or bus interface unit to direct interaction with the processor bus 412.

Processor bus 412, also known as the host bus or the front side bus, may be used to couple the processors 402-406 with the system interface 414. Processor bus 412 may include a control bus 432, an address bus 434, and a data bus 436. The control bus 432, the address bus 434, and the data bus 436 may be multidrop bi-directional buses, e.g., connected to three or more bus agents, as opposed to a point-to-point bus, which may be connected only between two bus agents.

System interface 414 (or chipset) may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. For example, as illustrated, the I/O interface 420 may interface an I/O bridge 424 with the processor bus 412. I/O bridge 424 may operate as a bus bridge to interface between the system interface 414 and an I/O bus 426. One or more I/O controllers and/or I/O devices may be connected with the I/O bus 426, such as I/O controller 428 and I/O device 430, as illustrated. I/O bus 426 may include a peripheral component interconnect (PCI) bus or other type of I/O bus.

System 400 may include a dynamic storage device, referred to as main memory 416, or a random access memory (RAM) or other devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406.

Main memory 416 or dynamic storage device may include a magnetic disk or an optical disc for storing information and instructions. I/O device 430 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 400 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 400 may vary from implementation to implementation depending upon numerous factors, such as price constraints, performance requirements, technological improvements, and/or other circumstances.

It should be noted that, while the embodiments described herein may be performed under the control of a programmed processor, such as processors 402-406, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method for reducing prefetching of incoming packets, the method comprising:

receiving a packet at a network interface card (NIC) in communication with a host computer system (host system) and a network, the packet received from the network, the packet having a packet address;

performing a lookup of an information table to determine whether prefetching was recently performed on the packet address, wherein the information table includes packet addresses associated with recently received packets;

forwarding the packet to the host system without having to prefetch the packet, if the packet was recently prefetched; and matching the packet address with known packet addresses in a memory at the NIC, if the packet was not recently prefetched, wherein a match of the packet address with a known packet address triggers prefetching of the packet and the information table is undated, wherein a non-match of the packet address with the known packet addresses indicates prefetching of the packet is not needed and the packet is forwarded to the host system.

2. The method of claim 1, further comprising the issuing a prefetch directive to prefetch the packet, and loading the packet address to cache.

3. The method of claim 1, further comprising known packet addresses, wherein the maintaining of the known packet address includes one or more of adding contents associated with each of the known packet addresses, and deleting contents associated with each of the known packet addresses.

4. The method of claim 1, further comprising updating the information table by including context information associated with the packet if the prefetch directive is issued and the packet is prefetched.

5. A system, comprising:

a router to route data within a plurality of networks, the plurality of networks having a network in communication with a network interface card (NIC) coupled with a host computer system (host system); and the NIC to receive a packet from the network, the packet having a packet address, wherein the NIC having a connection lookup determinator to perform a lookup of an information table to determine whether prefetching was recently performed on the packet address, wherein the information table includes packet addresses associated with recently received packets, the NIC to forward the packet to the host system without having to prefetch the packet, if the packet was recently prefetched, and to match the packet address with known packet addresses in a memory at the NIC, if the packet was not recently prefetched, wherein a match of the packet address with a known packet address triggers prefetching of the packet and the information table is updated, wherein a non-match of the packet address with the known packet addresses indicates prefetching of the packet is not needed and the packet is forwarded to the host system.

6. The system of claim 5, a prefetch directive generator to issue a prefetch directive, and to load the packet address to cache.

7. The system of claim 5, wherein the host system is further to maintain the known packets, the maintaining of the known packets includes one or more of adding contents associated with each of the known packet addresses, and deleting contents associated with each of the known packet addresses.

8. The system of claim 5, wherein the NIC is further to update the information table by including context information associated with the packet if the prefetch directive is issued and the packet is prefetched.

9. A computer readable storage medium stored with computer executable instructions which, when executed, cause the machine to:
- receive a packet at a network interface card (NIC) in communication with a host computer system (host system) and a network, the packet received from the network, the packet having a packet address;
- perform a lookup of an information table to determine whether prefetching was recently performed on the packet address at the host system, wherein the information table includes context information associated with recently received packets;
- forward the packet to the host system without having to prefetch the packet, if the packet was recently prefetched; and
- match the packet address with known packet addresses in a memory at the NIC, if the packet was not recently prefetched, wherein a match of the packet address with a known packet address triggers prefetching of the packet and the information table is updated, wherein a non-match of the packet address with the known packet addresses indicates prefetching of the packet is not needed and the packet is forwarded to the host system.

10. The computer readable storage medium of claim 9, wherein the instructions, when executed, further cause the machine to issue a prefetch directive, and load the packet address to cache.

11. The computer readable storage medium of claim 9, wherein the instructions, when executed, further cause the machine to maintain the known packet addresses, wherein the maintaining of the known packet addresses includes one or more of adding contents associated with each of the known packet addresses, and deleting contents associated with each of the known packet addresses.

12. The computer readable storage medium of claim 9, wherein the instructions, when executed, further cause the machine to update the information table by including context information associated with the packet if the prefetch directive is issued and the packet is prefetched.

* * * * *